(12) United States Patent
VanBlon et al.

(10) Patent No.: US 10,917,386 B2
(45) Date of Patent: Feb. 9, 2021

(54) DETERMINING IF A CORRESPONDENT DEVICE IS TRUSTED

(71) Applicant: LENOVO (Singapore) PTE. LTD., New Tech Park (SG)

(72) Inventors: Russell Speight VanBlon, Raleigh, NC (US); Justin Tyler Dubs, Raleigh, NC (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 289 days.

(21) Appl. No.: 15/912,402

(22) Filed: Mar. 5, 2018

(65) Prior Publication Data
US 2019/0273723 A1 Sep. 5, 2019

(51) Int. Cl.
*H04L 29/06* (2006.01)

(52) U.S. Cl.
CPC ...... *H04L 63/0272* (2013.01); *H04L 63/0876* (2013.01); *H04L 63/205* (2013.01)

(58) Field of Classification Search
CPC ............. H04L 63/0272; H04L 63/0876; H04L 63/205
See application file for complete search history.

(56) References Cited

U.S. PATENT DOCUMENTS

| | | | | |
|---|---|---|---|---|
| 8,949,466 B1 * | 2/2015 | Crosbie | ................... | H04L 47/38 709/247 |
| 9,450,604 B1 * | 9/2016 | Kumaran | ............ | H03M 7/3082 |
| 9,596,311 B2 * | 3/2017 | Li | .......................... | H04L 65/80 |
| 2002/0010869 A1 * | 1/2002 | Kim | .................. | H04L 29/12924 726/13 |
| 2004/0125793 A1 * | 7/2004 | Yi | .......................... | H04L 67/04 370/352 |
| 2008/0228933 A1 * | 9/2008 | Plamondon | ............. | H03M 7/30 709/230 |
| 2015/0229609 A1 * | 8/2015 | Chien | ................. | G06F 21/6218 726/13 |
| 2016/0381079 A1 * | 12/2016 | Ben-Shalom | ......... | H04L 63/105 726/29 |
| 2017/0093947 A1 * | 3/2017 | Smith | .............. | H04N 21/23805 |
| 2017/0164232 A1 * | 6/2017 | Maric | ................... | H04W 28/06 |
| 2019/0215308 A1 * | 7/2019 | Feyzibehnagh | ..... | H04L 63/0428 |
| 2019/0273723 A1 * | 9/2019 | VanBlon | ............. | H04L 63/0272 |

OTHER PUBLICATIONS

Janet Rodgers, Square roots by hand: Divide and Average, Aug. 31, 1996, The Match Forum (Year: 1996).*
NPL Search (Google Scholar) (Year: 2020).*

* cited by examiner

*Primary Examiner* — Mahfuzur Rahman
*Assistant Examiner* — Richard W Cruz-Franqui
(74) *Attorney, Agent, or Firm* — Kunzler Bean & Adamson

(57) ABSTRACT

For secure communications, a processor determines if a correspondent device is trusted. In response to the correspondent device not being trusted, the processor terminates communications with the correspondent device. In response to the correspondent device being trusted, the processor exchanges unencrypted communications with the correspondent device over an IP interface.

16 Claims, 7 Drawing Sheets

300

| Processor Bandwidth Rating 305 |
|---|
| Battery Level 310 |
| IP Connection Bandwidth 315 |
| Internal Compression Score 320 |
| Correspondent Compression Score 325 |
| Compression Level 330 | ations for the secure communications.

DETERMINING IF A CORRESPONDENT DEVICE IS TRUSTED

FIELD

The subject matter disclosed herein relates to correspondent devices and more particularly relates to determining if a correspondent device is trusted.

BACKGROUND

Secure communications may increase computational demands for the secure communications.

BRIEF SUMMARY

An apparatus for determining if a correspondent device is trusted is disclosed. The apparatus includes an Internet Protocol (IP) interface, a processor, and a memory that stores code executable by the processor. The processor determines if a correspondent device is trusted. In response to the correspondent device not being trusted, the processor terminates communications with the correspondent device. In response to the correspondent device being trusted, the processor exchanges unencrypted communications with the correspondent device over the IP interface. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
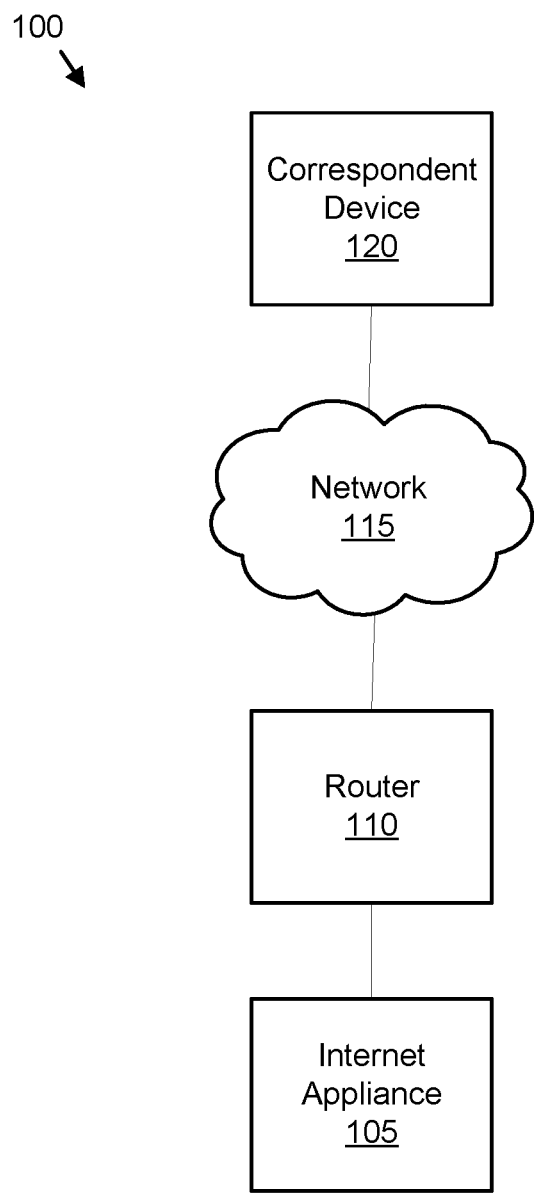
FIG. 1 is a schematic block diagram illustrating one embodiment of an Internet appliance system.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment of an Internet appliance system 100. The system 100 facilitates communications between an Internet appliance 105 and a correspondent device 120. In the depicted embodiment, the system 100 includes the Internet appliance 105, a router 110, a network 115, and the correspondent device 120.

The Internet appliance 105 may be a sensor such as a camera, a microphone, a thermostat, and the like. In addition, the Internet appliance 105 may be a computer, hard disk drive, an entertainment system, and the like.

The correspondent device 120 may be a mobile telephone, a computer, a server, and the like. The network 105 may comprise the Internet, a mobile telephone network, a Wi-Fi network, a local area network, a wide-area network, or combinations thereof. In one embodiment, the router 110 manages communications between the Internet appliance 105 and the network 115.

In one exemplary embodiment of the system 100, the Internet appliance 105 is a video camera that may stream surveillance video to a mobile telephone correspondent device 120. Communications from the Internet appliance 105 must be secure to prevent unauthorized persons from intercepting the communications from the Internet appliance 105. For example, an unauthorized person may attempt to intercept the video stream from the video camera Internet appliance 105.

In the past, communications with Internet appliances 105 have been secured using a Virtual Private Network (VPN), a Secure Shell (SSH) tunnel, or other encryption schemes. Unfortunately, the use of encryption increases the computational and power demands on the Internet appliance 105, the router 110, the network 115, and/or the correspondent device 120. As a result, securely accessing the Internet appliance 105 significant increases the consumption of resources.

The embodiments described herein determine if the correspondent device 120 is trusted by the Internet appliance 105 and/or router 110. In response to determining that the correspondent device 120 is trusted, the Internet appliance 105 and/or router 110 may exchange unencrypted communications with the correspondent device 120. As a result, the Internet appliance 105 may be securely accessed with greatly reduced computational and power demands as will be described hereafter.

Figure 2:
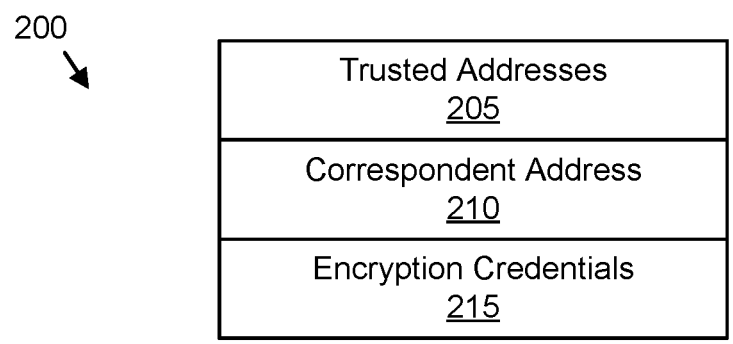
FIG. 2 is a schematic block diagram illustrating one embodiment of trust data.

FIG. 2 is a schematic block diagram illustrating one embodiment of trust data 200. The trust data 200 may be used by the Internet appliance 105 and/or the router 110 to determine whether the correspondent device 120 is trusted. The trust data 200 may be organized as a data structure in a memory. In the depicted embodiment, the trust data 200 includes trusted addresses 205, a correspondent address 210, and encryption credentials 215.

The trusted addresses 205 may store addresses for one or more trusted correspondent devices 120. The address for each trusted correspondent device 120 may include an Internet Protocol (IP) address, a Media Access Control (MAC) address, a public encryption key, or combinations thereof.

The correspondent address 210 may store the address of a correspondent device 120 that requests to communicate with the Internet appliance 105 and/or the router 110. The correspondent address 210 may be recorded from a request to communicate.

The encryption credentials 215 may store credentials for communicating via VPN, SSH, and/or other encrypted communication schemes with the correspondent device 120. The encryption credentials 215 may be used to establish secure communications with the correspondent device 120.

Figure 3:
FIG. 3 is a schematic block diagram illustrating one embodiment of compression data.

FIG. 3 is a schematic block diagram illustrating one embodiment of compression data 300. The compression data 300 may be used to negotiate a data compression level 330 between the Internet appliance 105 and/or the router 110 and the correspondent device 120. The compression data 300 may be organized as a data structure in a memory. In the depicted embodiment, the compression data 300 includes a processor bandwidth rating 305, a battery level 310, an IP connection bandwidth 315, an internal compression score 320, a correspondent compression score 325, and the compression level 330.

The processor bandwidth rating 305 may specify a processor bandwidth for the Internet appliance 105, router 110, and/or correspondent device 120. The processor bandwidth may denote a number of bytes that may be compressed in a rating time interval using available processor bandwidth. The processor bandwidth may be an average available processor bandwidth. For example, the processor bandwidth may be expressed as bytes of compressed data per second. In addition, the processor bandwidth may include a peak available processor bandwidth. In one embodiment, the processor bandwidth includes an integral of available processor bandwidth over the rating time interval.

The battery level 310 may specify a current battery level for the Internet appliance 105, the router 110, and/or the correspondent device 120. The current battery level may be specified as a percentage of a full charge. In addition, the current battery level may be specified as a time interval for which a battery could maintain the processor bandwidth rating 305.

The IP connection bandwidth 315 may specify a data transfer rate between the Internet appliance 105 and the correspondent device 120. In addition, the IP connection bandwidth 315 may specify a data transfer rate between the router 110 and the correspondent device 120. The data transfer rate may be measured in megabits per second.

The internal compression score 320 may be calculated for the Internet appliance 105 and/or router 110 from the processor bandwidth rating 305, the battery level 310, and/or the IP connection bandwidth 315. The correspondent compression score 325 may also be calculated for the correspondent device 120 from the processor bandwidth rating 305, the battery level 310, and/or the IP connection bandwidth 315. In one embodiment, the correspondent device 120 calculates the correspondent compression score 325 and communicates the correspondent compression score 325 to the Internet appliance 105 and/or router 110.

Figure 4:
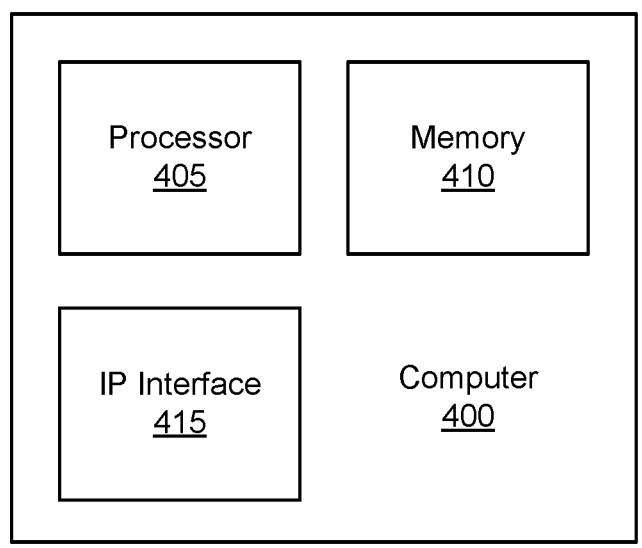
FIG. 4 is a schematic block diagram illustrating one embodiment of a computer.

FIG. 4 is a schematic block diagram illustrating one embodiment of a computer 400. The computer 400 may be embodied in one or more of the Internet appliance 105, the router 110, and the correspondent device 120. In the depicted embodiment, the computer 400 includes a processor 405, a memory 410, and an IP interface 415. The memory 410 may include a semiconductor storage device, hard disk drive, an optical storage device, a micromechanical storage device, or combinations thereof. The memory 410 may store code. The processor 405 may execute the code. The IP interface 415 may communicate with other devices. For example, the IP interface 415 of the Internet appliance 105 may communicate with the router 110.

Figure 5A:
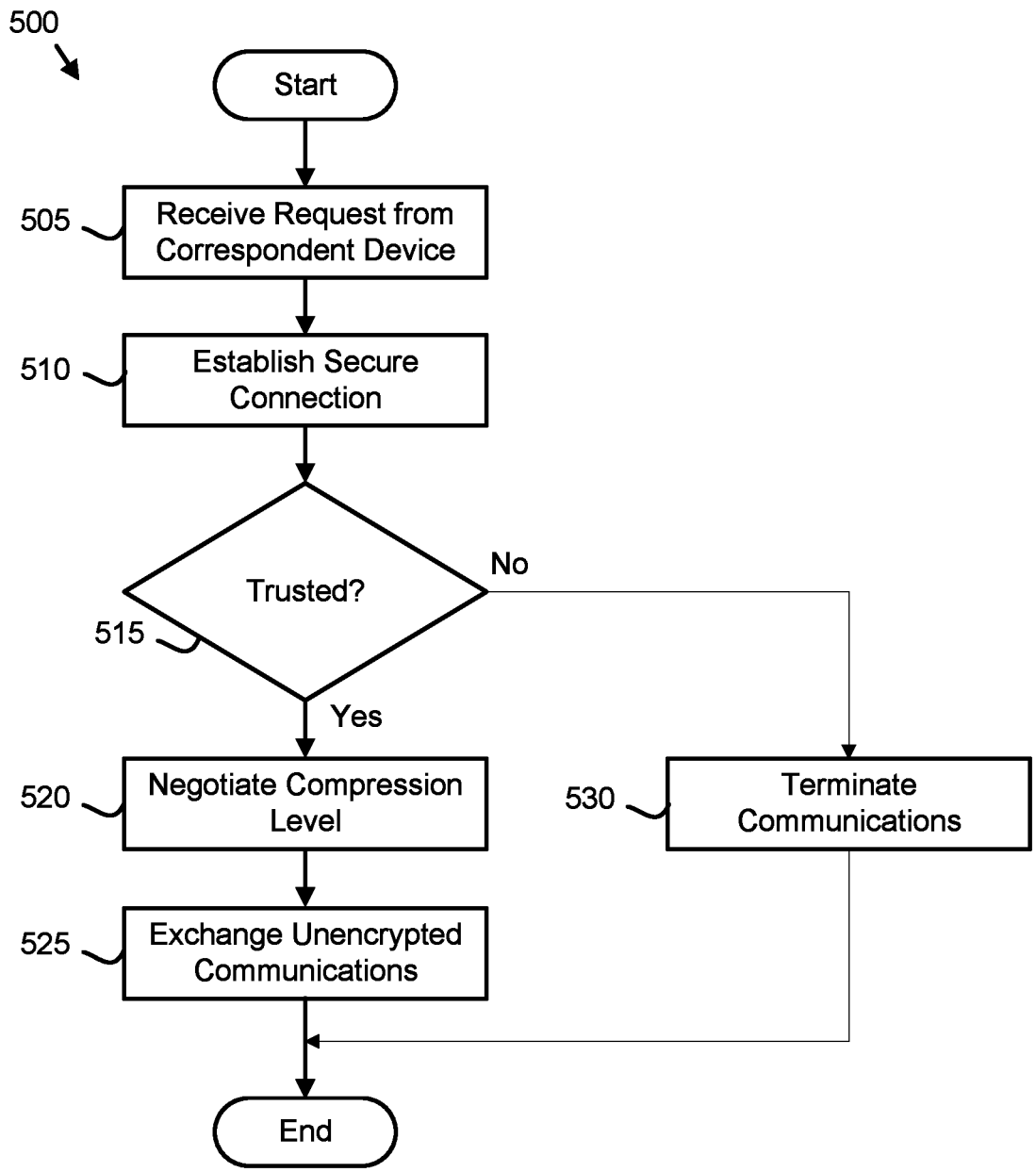
FIG. 5A is a schematic flow chart diagram illustrating one embodiment of a trust determination method.

FIG. 5A is a schematic flow chart diagram illustrating one embodiment of a trust determination method 500. The method 500 may determine if the correspondent device 120 is trusted. In addition, the method 500 may exchange unencrypted communications with the correspondent device 120 in response to determining that the correspondent device 120 is trusted. The method 500 may be performed by the computer 400 of the Internet appliance 105 and/or the router 110. In addition, the method 500 may be performed by the processor 405 of the computer 400.

The method 500 starts, and in one embodiment, the processor 405 receives 505 a request to communicate from the correspondent device 120. The request may be received 505 via the network 115 and/or network 115 and router 110 at the IP interface 415. The request may include the correspondent address 210. In addition, the request may include one or more encryption credentials 215.

In one embodiment, the processor 405 establishes 510 secure communications with the correspondent device 120. The processor 405 may use the encryption credentials 215 received from the correspondent device 120 and/or stored by the Internet appliance 105 and/or router 110 to establish 510 the secure communications. The secure communications may be a VPN connection. In addition, the secure communications may be an SSH tunnel.

The processor 405 may determine 515 if the correspondent device 120 is trusted. The correspondent device 120 may be determined 515 to be trusted in response to recognizing the IP address of the correspondent device 120 as a trusted IP address in the trusted addresses 205. In addition, the correspondent device 120 may be determined to be trusted in response to recognizing the MAC address of the correspondent device 120 as a trusted MAC address in the trusted addresses 205.

In one embodiment, the correspondent device 120 is determined 515 to be trusted in response to establishing the secure communications with the correspondent device 120. The correspondent device 120 may be determined 515 to be trusted in response to establishing the VPN connection with the correspondent device 120. In addition, the correspondent device 120 may be determined 515 to be trusted in response to establishing the SSH tunnel with the correspondent device 120.

In response to the correspondent device 120 not being trusted, the processor 405 may terminate 530 communications with the correspondent device 120. In one embodiment, the processor 405 accepts no communications originating from the correspondent address 210 of the correspondent device 120. In addition, the processor 405 may accept no communications employing the encryption credentials 215 of the correspondent device 120.

In response to the correspondent device 120 being trusted, the processor 405 may negotiate 520 a compression level 330 for communications with the correspondent device 120. The compression level 330 may be for the VPN connection with the correspondent device 120. The negotiation 520 of the compression level 330 is described in more detail in FIG. 5B.

In response to the correspondent device 120 being trusted, the processor 405 may exchange 525 unencrypted communications with the correspondent device 120 and the method 500 ends. By exchanging 525 unencrypted communications, the use of computational and bandwidth resources for the communications with the correspondent device 120 is greatly reduced, improving the efficiency of the communications.

Figure 5B:
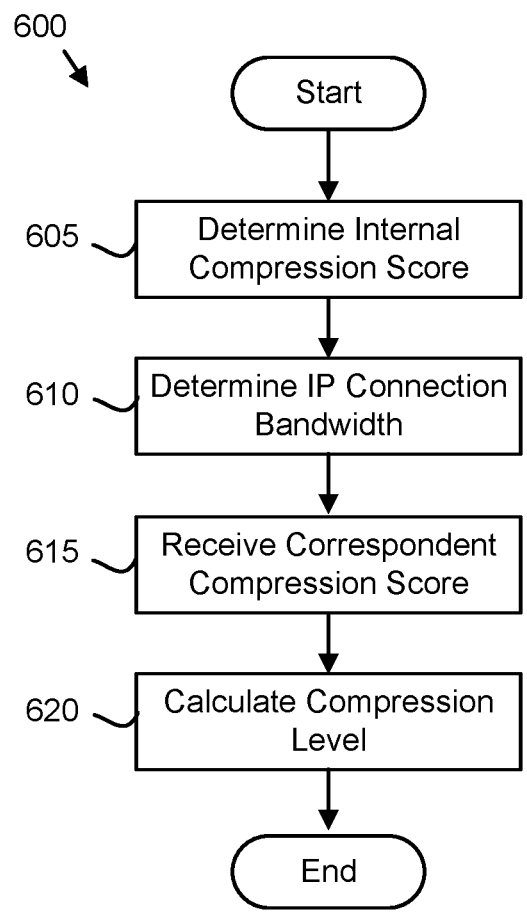
FIG. 5B is a schematic flow chart diagram illustrating one embodiment of a compression level negotiation method.

FIG. 5B is a schematic flow chart diagram illustrating one embodiment of a compression level negotiation method 600. The method 600 may negotiate a compression level 330 with the correspondent device 120. In one embodiment, the method 600 performs step 520 of FIG. 5A. The method 600 may be performed by the computer 400 of the Internet appliance 105 and/or the router 110. In addition, the method 600 may be performed by the processor 405 of the computer 400.

The method 600 starts, and in one embodiment, the processor 405 determines 605 the internal compression score 320 for communications over the IP interface 415. The internal compression score 320 may be calculated from the processor bandwidth rating 305 and the battery level 310. In addition, the internal compression score 320 may be a preprogrammed value.

The processor 405 may calculate a number of bytes that could be compressed during a rating time interval as the processor bandwidth rating 305. The processor 405 may further calculate the battery level 310 as the time interval that the battery could maintain the processor bandwidth rating 305. In addition, the processor 405 may calculate to the internal compression score 320 using Equation 1, where PB is the processor bandwidth rating 305 and BL is the battery level 310.

$$IC=PB*BL \qquad \text{Equation 1}$$

The processor 405 may further determine 610 the IP connection bandwidth 315. In one embodiment, the IP connection bandwidth 315 is determined 610 by pinging the correspondent device 120.

The processor 405 may receive 615 the correspondent compression score 325 from the correspondent device 120. The correspondent device 120 may calculate the correspondent compression score 325 using Equation 1. In an alternative embodiment, the processor 405 may receive 615 a processor bandwidth rating 305 and the battery level 310 from the correspondent device 120 and calculate the correspondent compression score 325 using Equation 1.

The processor 405 may calculate 620 the compression level 330 based on the internal compression score 320, the IP connection bandwidth 315, and the correspondent compression score 325 and the method 600 ends. In one embodiment, the compression level CL 330 is calculated using Equation 2, wherein CB is the IP connection bandwidth 315, IC is the internal compression score 320, CC is the correspondent compression score 325, min is a minimum function, and k is a non-zero constant.

$$CL=\min(CB, k\sqrt{IC*CC}) \qquad \text{Equation 2}$$

Figure 5C:
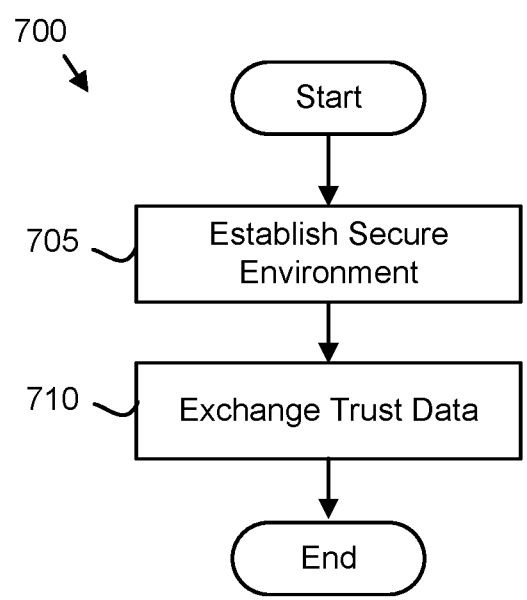
FIG. 5C is a schematic flow chart diagram illustrating one embodiment of exchanging trust data.

FIG. 5C is a schematic flow chart diagram illustrating one embodiment of a trust data exchange method 700. The method 700 may exchange the trust data 200 or portions thereof between the Internet appliance 105 and/or router 110 and the correspondent device 120. The method 700 may be performed by the computer 400 of the Internet appliance 105 and/or the router 110. In addition, the method 700 may be performed by the processor 405 of the computer 400.

The method 700 starts, and in one embodiment, the processor 405 establishes 705 a secure environment with the correspondent device 120. The secure environment may include a user communicating an encryption credential 215 such as a string of numbers between the Internet appliance 105 and/or router 110 and the correspondent device 120 during a specified time interval. In addition, the secure environment may be established 705 by determining that the correspondent device 120 is in physical proximity to the Internet appliance 105 and/or router 110.

In response to establishing 705 the secure environment, the processor 405 may exchange the trust data 200 between the Internet appliance 105 and/or router 110 and the correspondent device 120 and the method 700 ends.

The embodiments determine if the correspondent device 120 is trusted and in response to determining that the correspondent device 120 is trusted, exchange communications included unencrypted communications with the correspondent device 120. As a result, only trusted correspondent devices 120 may establish communications with the Internet appliance 105 and/or router 110. However, communications between the Internet appliance 105 and/or router 110 may be unencrypted, reducing the computational and bandwidth burden of the communications. In addition, the embodiments may negotiate the compression level 334 communications between the Internet appliance 105 and/or router 110 and the correspondent device 120.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   an Internet Protocol (IP) interface;
   a hardware processor;
   a non-transitory computer readable storage medium that stores code executable by the processor to:
   receive a request to communicate from a correspondent device;
   establish secure communications with the correspondent device;
   determine when the correspondent device is trusted;
   in response to the correspondent device not being trusted, terminate communications with the correspondent device;
   in response to the correspondent device being trusted, determine an internal compression score for communications over an Internet Protocol (IP) interface;
   in response to the correspondent device being trusted, determine an IP connection bandwidth;
   in response to the correspondent device being trusted, receive a correspondent compression score for the correspondent device;
   in response to the correspondent device being trusted, calculate a compression level based on the internal compression score, the IP connection bandwidth, and the received correspondent compression score, wherein the compression level CL is calculated as CL=min(CB,k$\sqrt{IC*CC}$), wherein CB is the IP connection bandwidth, IC is the internal compression score, CC is the correspondent compression score, and k is a non-zero constant; and
   in response to the correspondent device being trusted, exchange unencrypted communications with the correspondent device over the IP interface using the compression level.

2. The apparatus of claim 1, wherein the correspondent device is determined to be trusted in response to recognizing an IP address of the correspondent device as a trusted IP address.

3. The apparatus of claim 1, wherein the correspondent device is determined to be trusted in response to recognizing a Media Access Control (MAC) address of the correspondent device as a trusted MAC address.

4. The apparatus of claim 1, wherein the code is further executable by the processor to establish a Virtual Private Network (VPN) connection with the correspondent device and the correspondent device is determined to be trusted in response to establishing the VPN connection with the correspondent device.

5. The apparatus of claim 1, wherein the code is further executable by the processor to negotiate a compression level for a VPN connection with the correspondent device.

6. The apparatus of claim 5, wherein negotiating the compression level comprises:
   determining an internal compression score for communications over the IP interface;
   determining an IP connection bandwidth;
   receiving a correspondent compression score for the correspondent device from the correspondent device; and
   calculating the compression level based on the internal compression score, the IP connection bandwidth, and the correspondent compression score.

7. The apparatus of claim 1, wherein the internal compression score IC is calculated as IC=PB*BL, where PB is a processor bandwidth rating and BL is a battery level.

8. The apparatus of claim 1, wherein the apparatus is selected from the group consisting of a router and an Internet appliance.

9. A method comprising:
   receiving, by use of a processor, a request to communicate from a correspondent device;
   establishing secure communications with the correspondent device;
   determining when the correspondent device is trusted;
   in response to the correspondent device not being trusted, terminating communications with the correspondent device;
   in response to the correspondent device being trusted, determining an internal compression score for communications over an Internet Protocol (IP) interface;
   in response to the correspondent device being trusted, determining an IP connection bandwidth;
   in response to the correspondent device being trusted, receiving a correspondent compression score for the correspondent device;
   in response to the correspondent device being trusted, calculating a compression level based on the internal compression score, the IP connection bandwidth, and the received correspondent compression score, wherein the compression level CL is calculated as CL=min(CB,k$\sqrt{IC*CC}$), wherein CB is the IP connection bandwidth, IC is the internal compression score, CC is the correspondent compression score, and k is a non-zero constant; and
   in response to the correspondent device being trusted, exchanging unencrypted communications with the correspondent device using the compression level.

10. The method of claim 9, wherein the correspondent device is determined to be trusted in response to recognizing an IP address of the correspondent device as a trusted IP address.

11. The method of claim 9, wherein the correspondent device is determined to be trusted in response to recognizing a Media Access Control (MAC) address of the correspondent device as a trusted MAC address.

12. The method of claim 9, wherein the method further comprises establishing a Virtual Private Network (VPN) connection with the correspondent device and the correspondent device is determined to be trusted in response to establishing the VPN connection with the correspondent device.

13. A program product comprising a non-transitory computer readable storage medium that stores code executable by a processor, the executable code comprising code to:
   receive a request to communicate from a correspondent device;
   establish secure communications with the correspondent device;
   determine when a correspondent device is trusted;
   in response to the correspondent device not being trusted, terminate communications with the correspondent device;
   in response to the correspondent device being trusted, determine an internal compression score for communications over an Internet Protocol (IP) interface;
   in response to the correspondent device being trusted, determine an IP connection bandwidth;
   in response to the correspondent device being trusted, receive a correspondent compression score for the correspondent device;
   in response to the correspondent device being trusted, calculate a compression level based on the internal compression score, the IP connection bandwidth, and the received correspondent compression score, wherein the compression level CL is calculated as $CL=\min(CB, k\sqrt{IC*CC})$, wherein CB is the IP connection bandwidth, IC is the internal compression score, CC is the correspondent compression score, and k is a non-zero constant; and in response to the correspondent device being trusted, exchange unencrypted communications with the correspondent device using the compression level.

14. The program product of claim 13, wherein the correspondent device is determined to be trusted in response to recognizing an IP address of the correspondent device as a trusted IP address.

15. The program product of claim 13, wherein the correspondent device is determined to be trusted in response to recognizing a Media Access Control (MAC) address of the correspondent device as a trusted MAC address.

16. The program product of claim 13, wherein the code is further executable by the processor to establish a Virtual Private Network (VPN) connection with the correspondent device and the correspondent device is determined to be trusted in response to establishing the VPN connection with the correspondent device.

* * * * *